United States Patent [19]
Hicks et al.

[11] Patent Number: 5,401,207
[45] Date of Patent: Mar. 28, 1995

[54] CRAB BUTCHERING MACHINE

[75] Inventors: Timothy S. Hicks, Seattle, Wash.;
Luc M. Therien, Vancouver, Canada

[73] Assignee: Flohr Metal Fabricators, Inc., Seattle, Wash.

[21] Appl. No.: 241,492

[22] Filed: May 12, 1994

[51] Int. Cl.$^6$ .............................................. A22C 29/02
[52] U.S. Cl. ........................................ 452/1; 83/425.2
[58] Field of Search .................. 452/1, 9, 10; 83/425.2

[56] References Cited

U.S. PATENT DOCUMENTS

| | | | |
|---|---|---|---|
| 3,302,236 | 2/1967 | Harris | 452/1 |
| 3,495,293 | 2/1970 | Tolley | 452/1 |
| 3,596,310 | 8/1971 | Tolley | 452/1 |
| 4,073,041 | 2/1978 | Davis et al. | 452/1 |
| 4,293,981 | 10/1981 | Smith | 452/1 |
| 4,337,552 | 7/1982 | Iwase | 452/1 |
| 4,494,277 | 1/1985 | Tolley et al. | 452/1 |
| 4,503,586 | 3/1985 | Lockerby et al. | 452/1 |
| 4,614,006 | 9/1986 | Lockerby et al. | 452/10 |
| 5,320,575 | 6/1994 | Fukamoto | 452/1 |

FOREIGN PATENT DOCUMENTS 4001122  7/1990  Germany ................. 452/1

Primary Examiner—Willis Little
Attorney, Agent, or Firm—Seed & Berry

[57] ABSTRACT

A crab processing machine has conveyed crab-gripping carriers which move a crab through a loading station, a measuring station, a mandible/carapace/tail removal station, a body cavity cleaning station, a gilling station, a splitting station, and a discharge station. Data accumulated at the measuring station is used to automatically control operation of a star wheel at the mandible/carapace/tail removal station, and to automatically control the location of a rotary splitting knife at the splitting station so that the cleaned crab carcass will be evenly divided.

18 Claims, 11 Drawing Sheets

CRAB BUTCHERING MACHINE

TECHNICAL FIELD

The present invention relates to crab processing machines in which fresh crabs are cleaned and sectioned, and more particularly relates to accurate holding, cleaning and bisecting of crab carcasses in such machines.

BACKGROUND OF THE INVENTION

The Alaska Crab Institute defines "Snow Crab" as any of the three crustacean species: chionocetes opilio, chionoctes bairdi, or chionocetes tanneri. The latter species is also known as tanner crab. To prevent risk of toxin build-up, snow crab are required to be butchered (cleaned) when live. The butchering involves removing the carapace (back), mandible, and tail, cleaning the guts from the body cavity, and then removing the gills, thereby leaving the legs, claws and an intermediate connecting body portion. When this body portion of the cleaned crab is bisected the two crab halves are known as "sections". A "section" consists of a cleaned body portion (often referred to as the "shoulder") connected by joints to a set of legs consisting of four walking legs and a non-walking leg supporting a claw. For purposes of this discussion, the "length" of a crab has reference to the mandible to tail dimension, and the "width" has reference to carapace dimension in the direction of the two sets of legs of the crab.

After the crab has been cleaned and sectioned, the sections are normally cooked, frozen and bulk-packed in fiber-board containers. It is preferred to accurately split the cleaned crab into sections having equal body portions because such sections normally bring a larger price in the crab section market.

Machines have been devised to assist in butchering snow crabs and halving them into sections. One such machine has consisted of an endless conveyor with crab gripping carriers at regular intervals for conveying live crabs in a head first direction through processing stations whereat the crabs are automatically decarapaced, cleaned, degilled, and sectioned. Each gripping carrier has comprised a pair of laterally spaced clamping arms which are arranged to clamp the two sets of legs of a crab against a mounting plate at clamping positions leaving the carapace free to be removed therebetween. The crabs are loaded into the gripping carriers at the leading edge thereof. The clamping arms automatically open (swing-up) at an upper loading station adjacent the tail end of the conveyor whereat a crab is loaded beneath the clamping arms which then automatically close into clamping position. A star wheel, located at the head end of the conveyor engages and removes the mandible, carapace and attached tail. Sets of water jets then clean the gut and then the gills from the conveyed crab as it moves upside down in the return bottom run of the conveyor toward the loading end (tail end) of the conveyor. Next a rotary cutter at a fixed central position beneath the conveyor splits the cleaned crab into sections. The sections are then released when the clamping arms are reopened by a cam preliminary to returning to the loading station.

The described machine, although having advantages over the prior art did not operate consistently on varying sizes of crabs, particularly in the removal of carapace, mandible and tail. Furthermore, since it is unlikely that the live crabs will be perfectly centered when loaded between the pairs of clamping arms on the gripping carriers, the described prior art machine has the shortcoming of not accurately bisecting the crabs. Also, the gripping carriers are not easy to load for high speed operation of the machine and did not adapt to varying crab sizes.

SUMMARY OF THE INVENTION

The present invention improves the described prior art machine by changing the loading arrangement, gripping carriers, the mandible, carapace and tail removing apparatus, and the splitting operation, and providing a measuring station establishing data which is processed for improved operation of the carapace, mandible, and tail removal apparatus and the splitting apparatus. In accordance with the present invention the gripping carriers on the conveyor of the described prior art machine are reversed and modified to provide easier loading and better gripping, and to aid centering of the crabs in the carriers. The measuring station includes a pair of feeler arms located at opposite sides of the center line of the conveyor so as to be spread apart by engagement with the carapace passing therebetween and operate rotary ,encoders. The feeler arms and their encoders have two functions. First the feeler arms are used to determine differences in crab sizes to correspondingly change the operation of the star wheel for removing the mandible, carapace and tail of each crab. Instead of operating on a fixed cycle as previously, the star wheel is moved in a cycle as each gripped crab passes by. In its initial position the star wheel starts removal of the mandible and carapace, and backs away as the carapace is thrown clear. Then the star wheel returns to its initial position at the proper time for tail removal which is determined by the length of the crab body along the travel path of the conveyor. The timing of this cycle is established for each crab as a result of the operation of the feeler arms at the measuring station.

The second function of the feeler arms and their encoders involves measuring the amount of center-line offset of the carapace of a passing non-centered crab. The resulting change in spread of the arms is sensed by the encoders, and the resulting signals are fed into a microprocessor which is programmed to operate a positioning mechanism for the splitting knife. The knife is mounted on a carriage which is moved off center by operation of a positioner controlled by the microprocessor to shift the knife off center relative to a conveyor center axis the same amount that the lateral center line of the carapace was off center relative to the conveyor center axis. The knife shifting for each crab is delayed to take into account the delay in arrival of the respective crab after passing between the feeler arms.

DETAILED DESCRIPTION OF THE INVENTION

Figure 1:
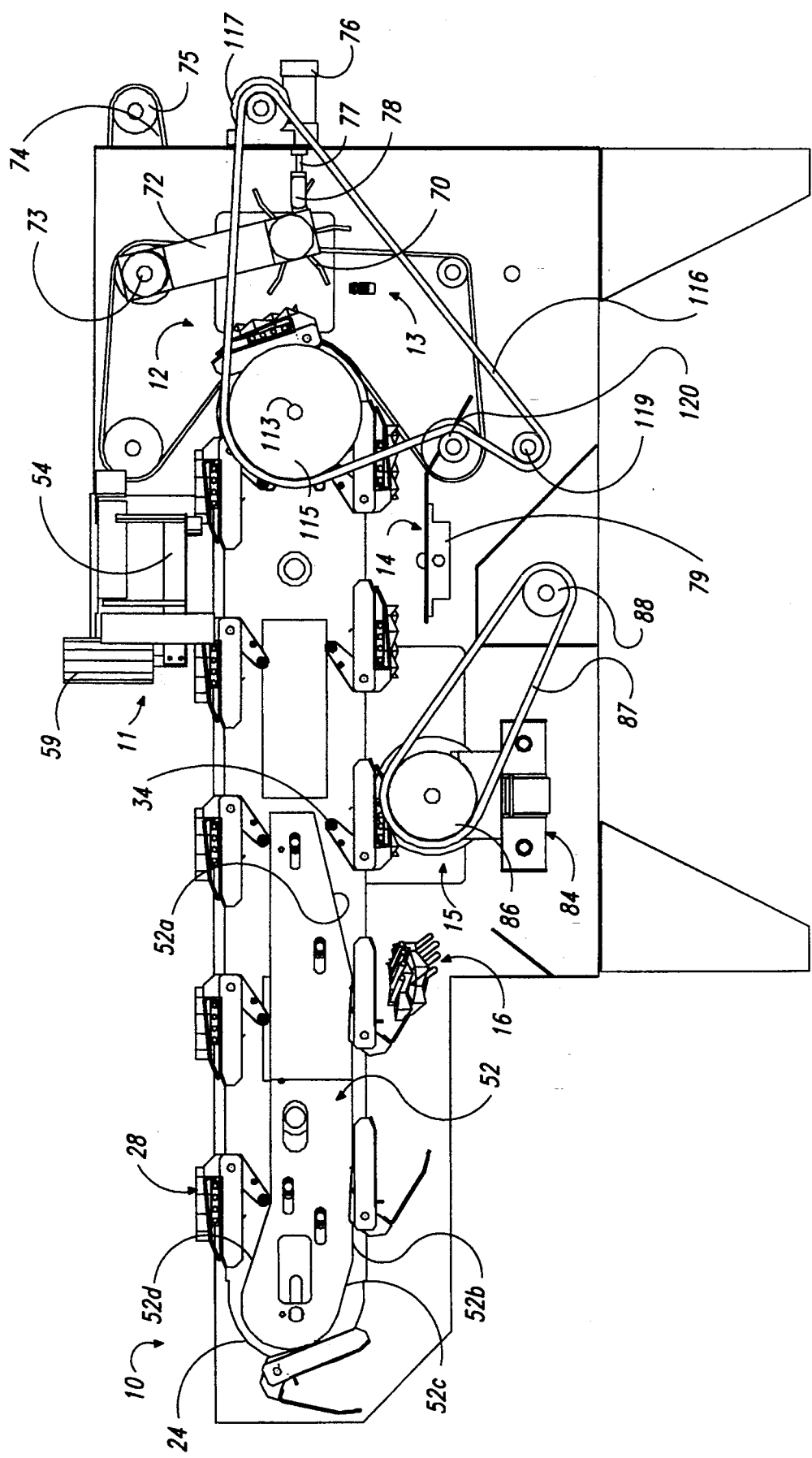
FIG. 1 is an abbreviated side elevational view of the machine.
Figure 2:
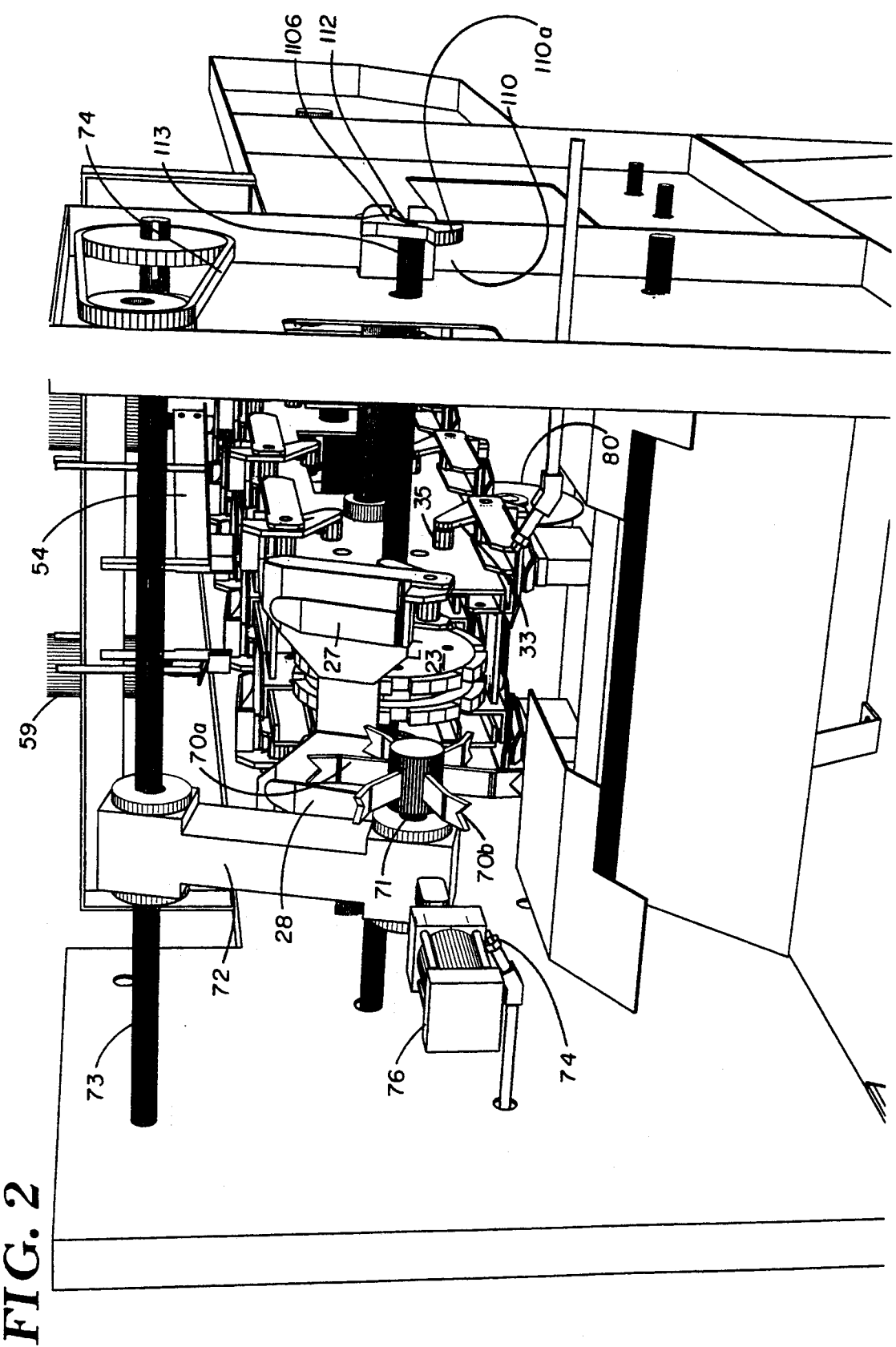
FIG. 2 is an isometric view looking from the front of the machine toward the loading end and without the conveyor links being shown.
Figure 5:
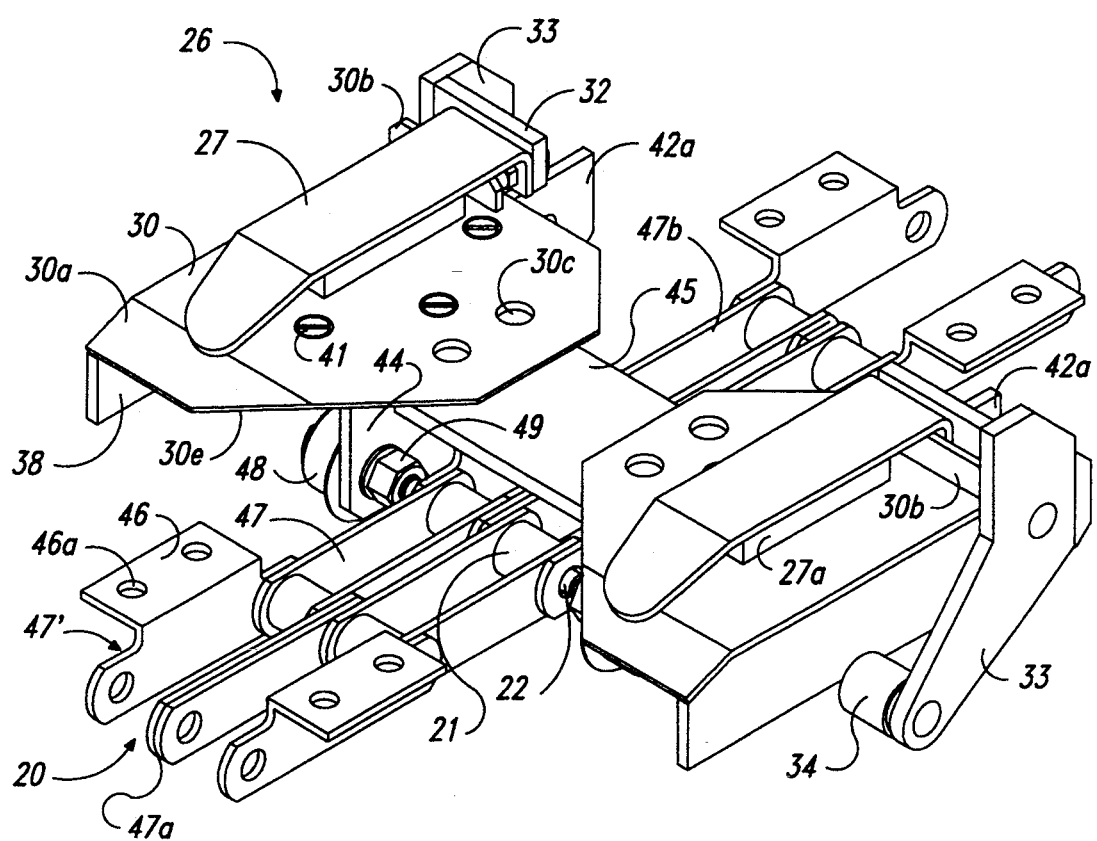
FIG. 5 is a perspective view of a crab carrier on the conveyor of the machine.
Figure 7:
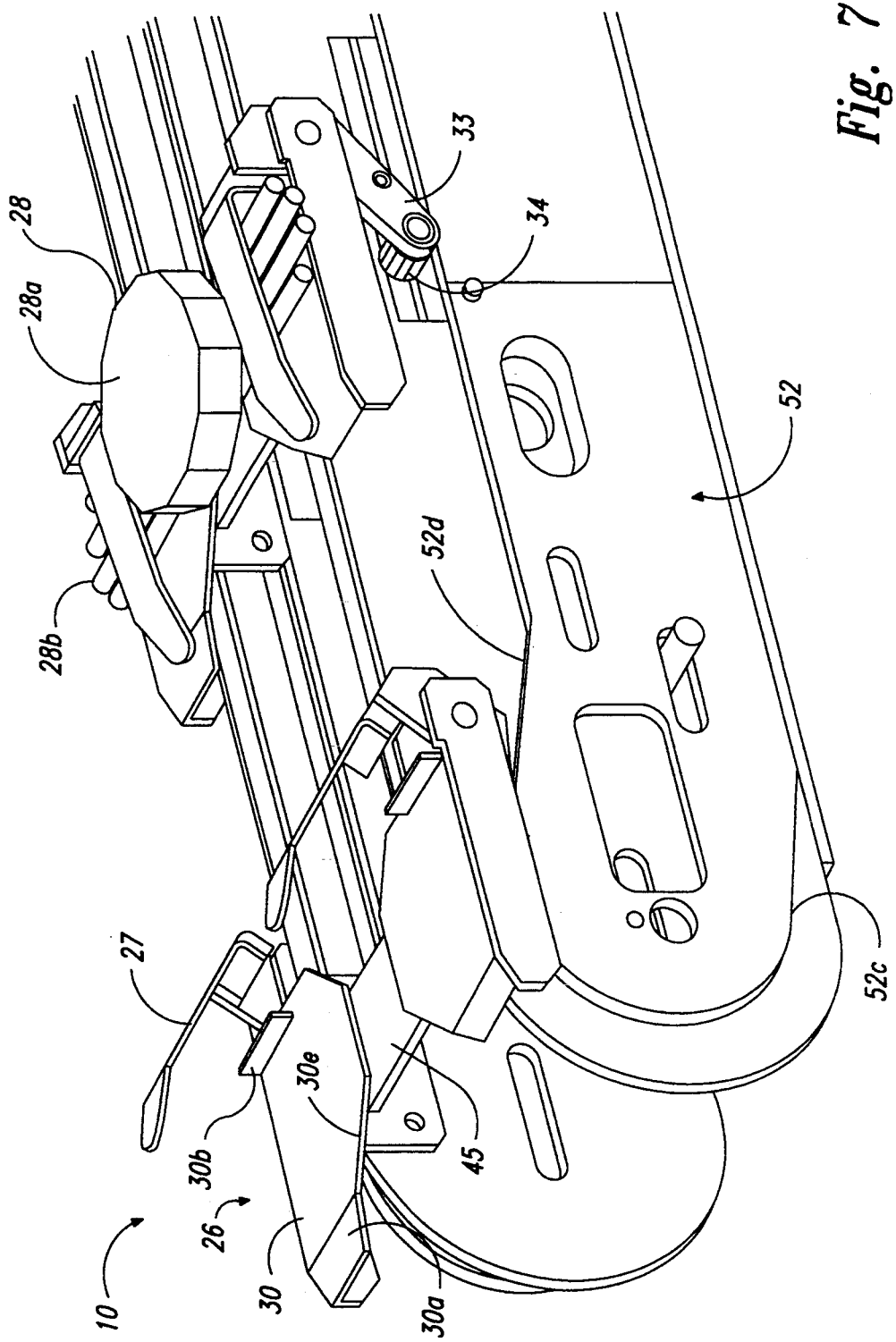
FIG. 7 is a fragmentary perspective view at the loading station.

Referring to FIGS. 2, 5 and 7, it is seen that a motor-driven endless conveyor 20 has pairs of rollers 21 on transverse link pins 22 arranged so that the rollers 21 track over pairs of head and rear end sprockets 23-24 to provide upper and lower runs in which the rollers 48 travel intermediate tracks 25 extending between the sprockets. The conveyor 20 carriers transverse crab carriers 26 at regular intervals on which are mounted side-by-side pairs of leg clamping arms 27. As will be explained, and as indicated in FIG. 1, the conveyor is powered by a variable speed drive 117 and passes the crab carriers by a loading station 10, measuring station 11, a mandible/carapace/tail removal station 12, a body cavity cleaning station 13, a gilling station 14, a splitting station 15, and a discharge station 16. For clarity of discussion the rear of the conveyor shall be described as being at the loading station and the front (head) of the conveyor shall be considered to be at the mandible/carapace/tail removal station. Hence, the upper run of the conveyor travels forwardly from the loading station, and the lower run of the conveyor travels rearwardly from the head sprockets of the conveyor. For purposes of illustration the body and legs of each crab 28 being processed are simulated by a central member 28a and two sets of rods 28b.

Figure 6:
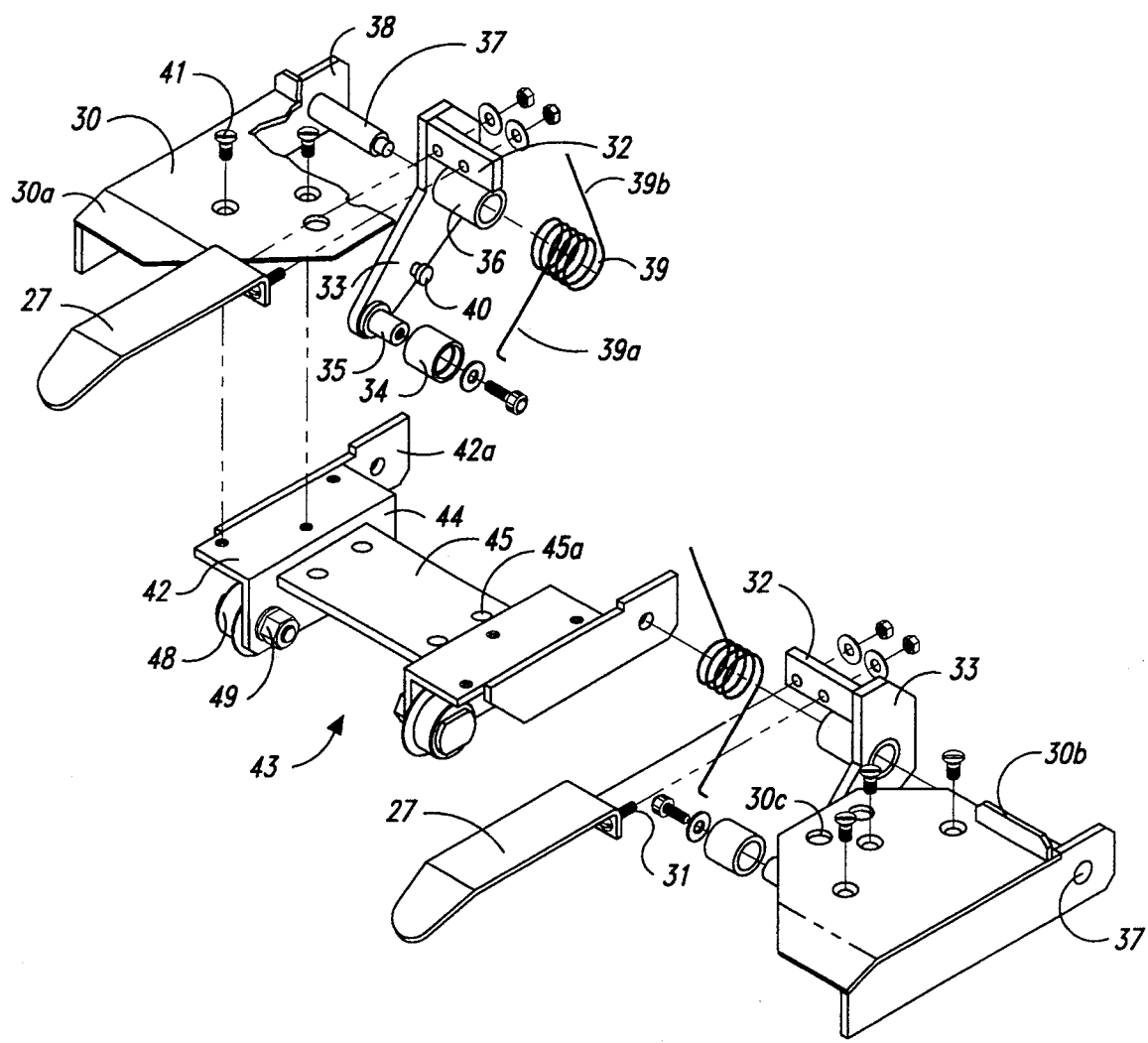
FIG. 6 is an exploded view of a crab carrier.

Directing attention to FIGS. 5-6, each clamping arm 27 on a carrier 26 is swing-mounted above a respective bed plate 30 and is connected by bolts 31 to a mounting ear 32 extending laterally from a follower arm 33 having a cam follower roller 34 mounted thereon by way of a stub shaft 35. Each follower arm 33 also has a laterally projecting boss 36 receiving a stub shaft 37 projecting from an outer side flange 38 on the respective bed plate 30. Each clamping arm 27 swings in concert with its connected follower arm 33 on the related stub shaft 37. A respective torsion spring 39 biases the clamping arms 27 toward the bed plates 30. Torsion springs 39 are sleeved on the bosses 36 and have one leg 39a engaging a button 40 on the follower arms and a second leg 39b engaging the underside of the bed plate 30.

The bed plates 30 are mounted by screws 41 to top flanges 42 of a truck unit 43 and have a rear entry ramp 30a and an upstanding front stop element 30b. At their outer edges the top flanges 42 have forwardly projecting side elements 42a with holes 42b through which the shafts 37 extend. The flanges 42 are integral with angle flanges 44 which are connected by a central plate 45 having pairs of bolt holes 45a adjacent its ends. These holes 45a register with holes 46a in flanges 46 provided on alternate links 47' of outer rows of chain links 47 which are connected by the pins 22 to overlapping pairs 47a and 47b of inner chain links. Respecting pairs of enlarged holes 30c in the bed plates 30 give access to the heads of bolts connecting the plate 45 to the chain link flanges 46. A pair of rollers 48 are mounted by bolts 49 on each angle flange 44 to travel on the tracks 25 alongside the conveyor 20. The inside portion of each bed plate 30 commencing at the ramp portion 30a has a tapered entry edge 30d to assist in initially centering crabs on the carriers 26. Preferably the underside of the clamping arms 27 are provided with neoprene gripping pads 27a for engaging the crab legs and better holding them in position.

As indicated in FIG. 1, a pair of vertical cam plates 52 are mounted alongside the conveyor 20 to be engaged by the follower rollers 34. The bottom edge of each cam plate 52 has a sloped bottom lead-in section 52a which is engaged by the follower rollers as they travel along the bottom run of the conveyor so that the follower arms 33 are rocked toward the respective bed plates 30 at the unloading station 16 to responsively swing the clamping arms away from the bed plates to an "open" position. This open position is preserved by a flat bottom section 52b and a curved transition section 52c as the conveyor chains travel around the rear sprockets 24 to loading station 10 at the start of the upper run of the conveyor. Starting at a relatively short distance forward of the start of the upper run of the conveyor the cam plates 52 present a ramp section 52d along which the follower rollers 34 track so that the follower arms 27 progressively rock downwardly at the conclusion of the loading station to thereby swing the clamping arms by the biasing action of the springs 39 toward the bed plates 30 into crab leg clamping position.

At the loading station 10 a crab 28 is manually positioned on the bed plates 30 of a carrier with its legs 28b positioned beneath the clamp arms 27 and its body 28a upright, engaging the stop elements 30b, and facing forwardly in approximately transversely centered position. In this position the width of the crab's carapace is oriented at 90 degrees to the travel path of the conveyor. The endless travel of a point on the bed plates midway between the conveyor chains will be herein referred to as the "travel axis". Ideally the crabs are positioned and clamped so that the crabs are centered along the travel axis. However, in actual practice this is usually not perfectly accomplished at the loading station, and so in accordance with the present invention the offset of the center line of the carapace is measured at the measuring station 11 and the position of a splitting knife at the splitting station 15 is adjusted in accordance with the measured offset when the carapace of the measured crab reaches the splitting station.

Figure 8:
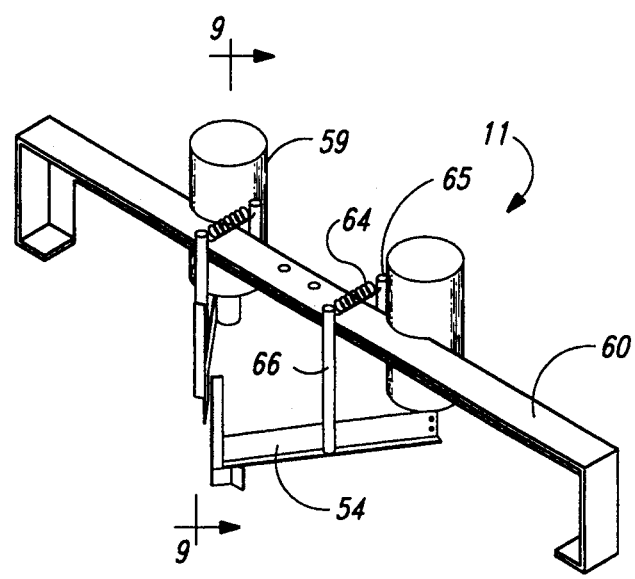
FIG. 8 is a front perspective view of the measuring apparatus at the measuring station.
Figure 9:
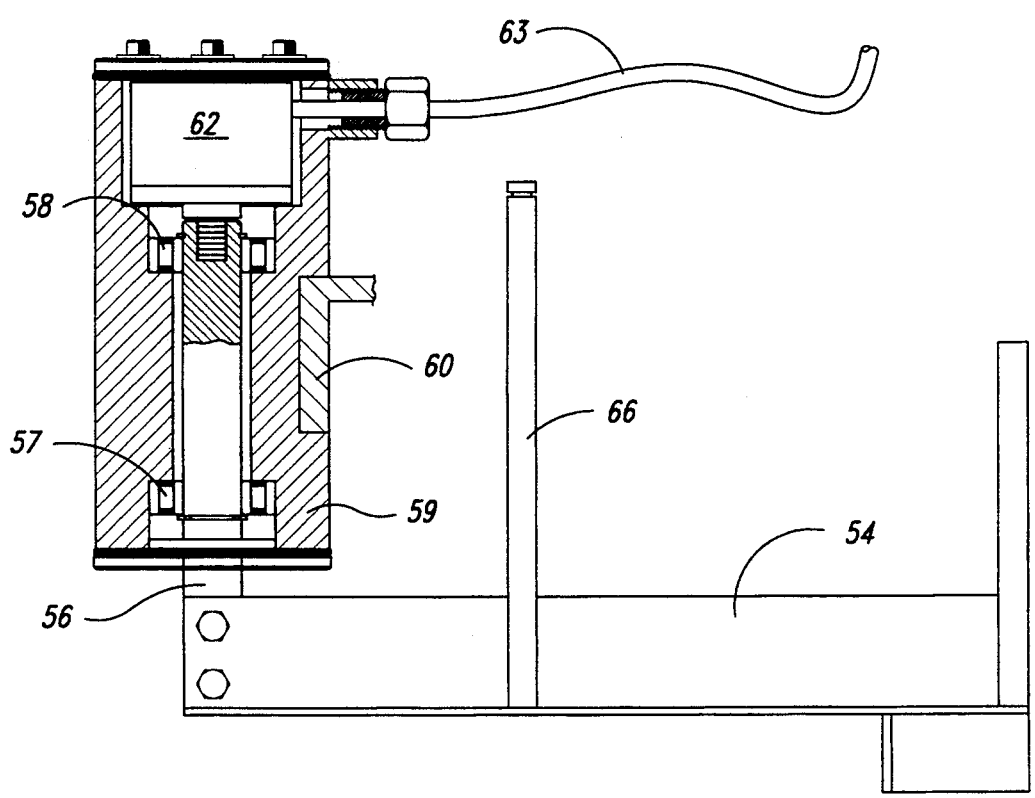
FIG. 9 is a vertical section view taken as indicated by line 9—9 in FIG. 8.
Figure 10C:
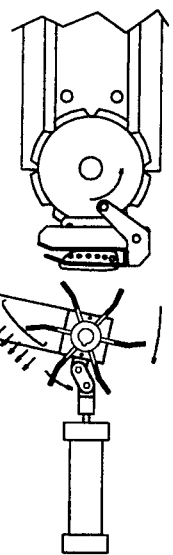
FIG. 10 is a side elevational view illustrating the starwheel cycle at the mandible carapace/tail removal station.
Figure 10B:
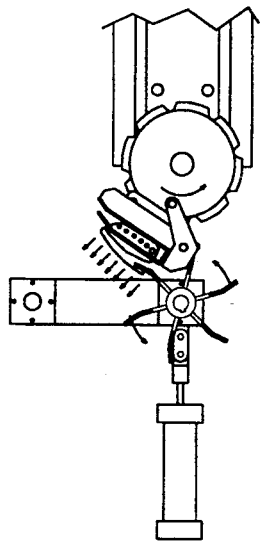
Figure 10E:
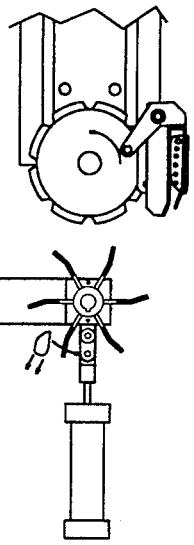
Figure 10A:
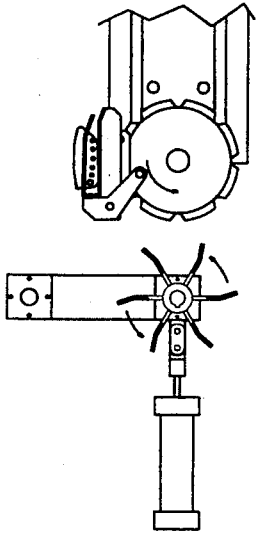
Figure 10D:
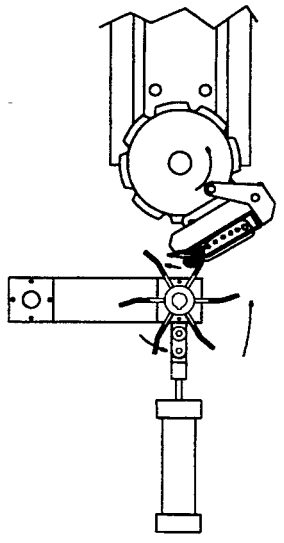

Referring to FIGS. 8-9, measuring of the length and position of each carapace at the measuring station 11 involves a pair of feeler arms 54 which project horizontally into the path of the body of the oncoming crab so as to be separated by engagement of the feeler arms with edge portions of the carapace at opposite lateral sides of the center axis of the conveyor. Each feeler arm 54 is mounted on the lower end of a shaft 56 which is journaled by bearings 57-58 in a sensor housing 59. The sensor housings 59 are fixed to a bridge 60 supported on the machine frame. Rotary encoders 62 in the housings 59 are connected to the upper end of the shafts 56 and leads 63 extend from the sensors to a microprocessor. The feeler arms 54 are biased to swing toward one another by springs 64 extending from posts 65 on the bridge 60 to posts 66 on the feeler arms 54.

Figure 3:
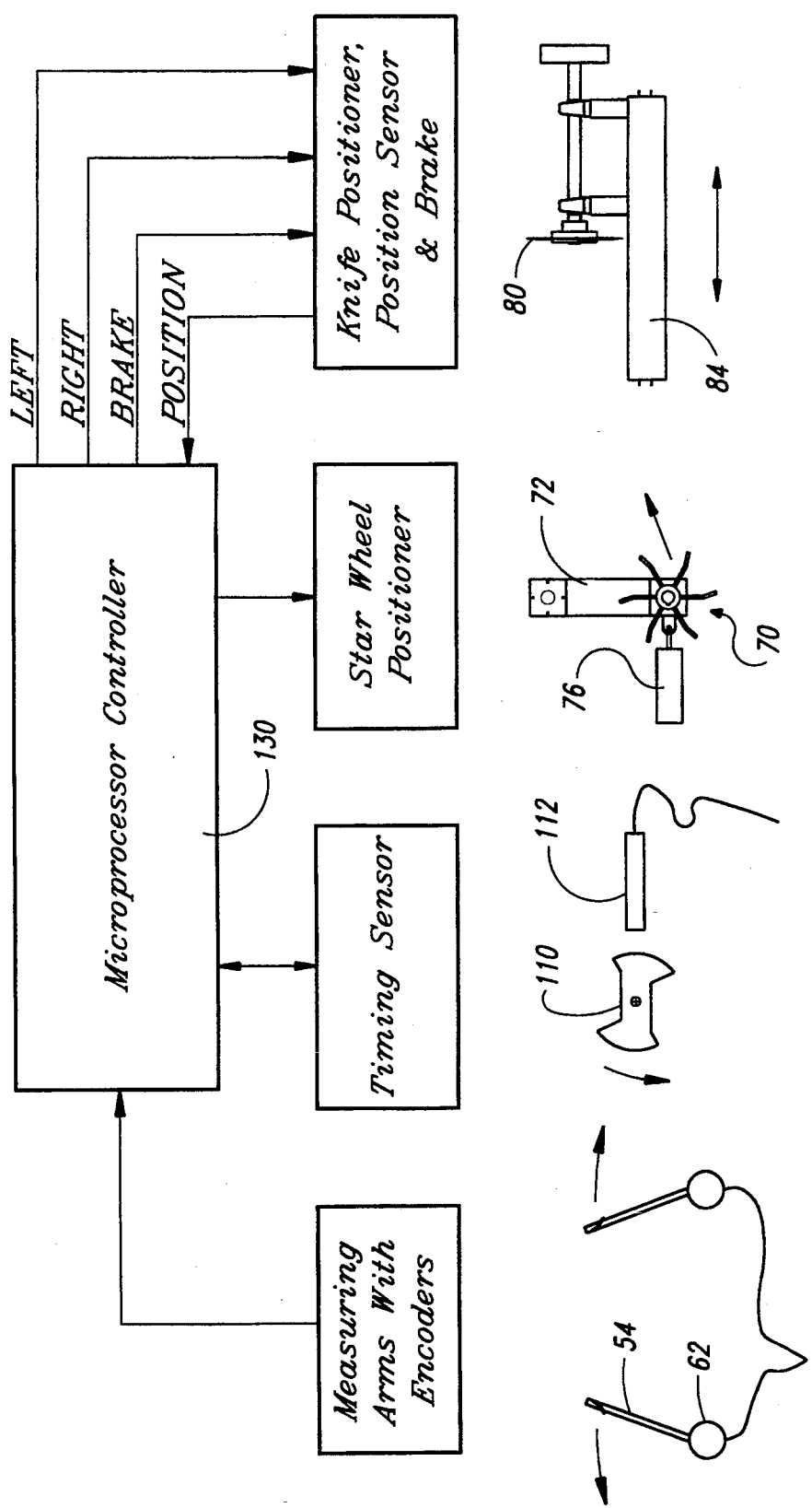
FIG. 3 is a schematic of the control system for the machine.
Figure 4:
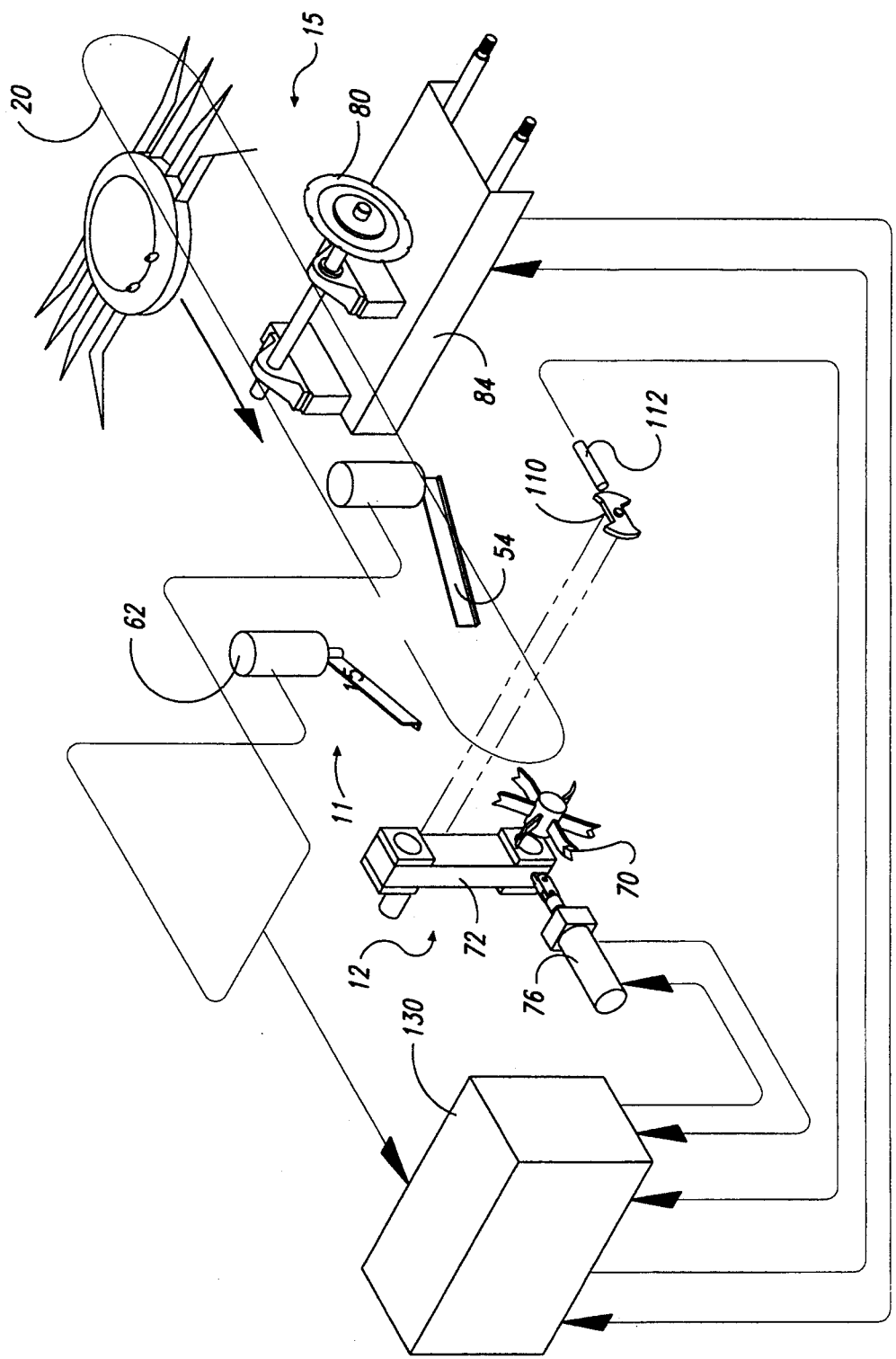
FIG. 4 is a schematic of the machine.

The encoders 62 sense the rotary movements of the shafts 56 and detect the maximum outward swing of each of the feeler arms 54 as the carapace passes between them. If the two encoder rotary deflection readings are the same the crab is centered relative to the travel axis. If the two encoder deflection readings are not equal, one-half of the difference between the readings is an indication of the distance that the crab is displaced from a centered position. The rotary encoder having the larger reading indicates which lateral direction the crab is displaced from a centered position. As indicated in FIGS. 3-4, the off-center distance and direction are processed in a micro-processor providing an output signal for operation of a linear actuator to move a splitting knife at the splitting station to an off-center position corresponding to that indicated by the sensors when the measured crab reaches the splitting station after passing the mandible/carapace/tail removal station, the body cleaning station, and the gilling station.

At the measuring station 11 a second measurement is performed, namely, the length of the carapace from front to back is determined in terms of the time period required for the feeler arms 54 to spread apart from an at rest position to the maximum spread position for the crab being measured, and to then return to the at rest position. This time period will hereinafter be referred to as the "carapace passage time" an is measured in fractions of a second. It has been found that the body length from front to back of a given species of crab is substantially proportional to the overlying carapace from front to back. Hence, the crab body length for a measured crab can be expressed as a linear function of the carapace passage time for the crab, and will hereinafter referred to as the "body passage time" also in fractions of a second. Because the speed of the conveyor chain 20 is adjustable, the body passage time correspondingly decreases as the speed of the conveyor chain increases. By measuring the length of a crab in time units (fractions of a second) the operations of the microprocessor controller 130 become independent of conveyor speed. As will be explained later, the body passage time is used to control the operation of the starwheel 70 at the mandible/carapace/tail removal station 12.

The star wheel 70 is mounted on a stub shaft 71 projecting from a swing housing 72 to aline the star wheel with the center axis of the conveyor passing through the rotational axes of the conveyor sprockets at the forward end of the machine. The swing housing 72 hangs from a cross-shaft 73 which is journaled at its ends on opposite sides of the machine housing and is rotated by a chain drive 74 from a motor/gear box 75. The cross-shaft 73 and stub shaft 71 have complementary sprockets in the swing housing 72 which are connected by an endless chain. Swinging of the swing housing 72 on the cross-shaft 73 is controlled by a solenoid-operated double-acting pneumatic cylinder unit 76 having its piston rod 77 provided with a tang end fitting connected via pivoting links 78 to a corresponding tang which is mounted on the swing housing 72. Positioning of the piston in the pneumatic cylinder unit 76 determines the extended and retracted positions of the star wheel 70 relative to the travel path of the conveyor 20. Both the extended and retracted positions of the piston are fixed by stops internal to the cylinder. The star wheel 70 has a hub from which six arms 70a project radially and then preferably bend slightly in the direction of the star wheel rotation to provide working outer end portions which may have a vee-shaped recess 70b. Also, the arms may be provided with triangular wings for processing certain species of crab. The direction of motion of the star wheel tips 70a is counter to the direction of motion of the conveyor chain 20.

Referring to FIG. 10, as the star wheel 70 rotates, it swings in a cycle between its extended and retracted positions to first remove the carapace of a conveyed crab, and to then remove the tail. At the start of the cycle the arms 70a rotate through the path of the carapace of an approaching crab (Frame A). When the carapace is part way around the adjacent conveyor sprocket one of the arms of the star wheel engages the underside of the front of the carapace at the mandible, separates them (Frame B), and then throws the carapace away from the body of the crab (Frame C). As the carapace is being thrown the star wheel is swung away (retracted) from the conveyor such as to clear the crab carcass. Referring to FIGS. 2 and 3, the point at which this retraction occurs is fixed in space relative to the position of the leading edge 30a of the crab carrier 30 by the position of the timing cam 110 connected to the main shaft 117. The mechanics of the system are such that two crab carriers 30 pass by the starwheel 70 for each revolution of the main shaft 117. Thus the timing cam 110 has two lobes 110a, 110b that can be synchronized with each passing crab carrier. When adjusted correctly, the leading edge of the timing cam lobes 110a, 110b trigger the timing sensor 112 at the precise moment when the rotating starwheel arm 70a contacts the mandible of the crab. When the timing sensor 112 is triggered, the microprocessor controller 130 activates the pneumatic positioning cylinder 76 causing the starwheel 70 to retract away from the crab carcass.

Referring to FIG. 10, the length of time that the starwheel remains retracted is equal to the body passage time described earlier. At the elapse of the body passage time, the microprocessor controller 130 activates the pneumatic positioning cylinder 76 causing the starwheel 70 to extend toward the crab carcass to remove the tail (Frame D). The removed tail is thrown clear as the crab body and attached legs reach the bottom run of the conveyor (Frame E).

Referring to FIGS. 1 and 2, after passing the carapace and tail removal station the crab carcass moves past a set of low pressure water jets 74 at the washing station 13. These jets are aimed at the body opening exposed by removal of the carapace and tail, and function to remove the guts from the crab. Then the cleaned crab carcass moves by a set of high pressure water jets projecting from a water manifold 79 at the gilling station 14 which are aimed to remove the gills. The crab carcass then progresses to the splitting station 15 for splitting of the carcass in half by a rotary splitting knife 80.

Figure 11:
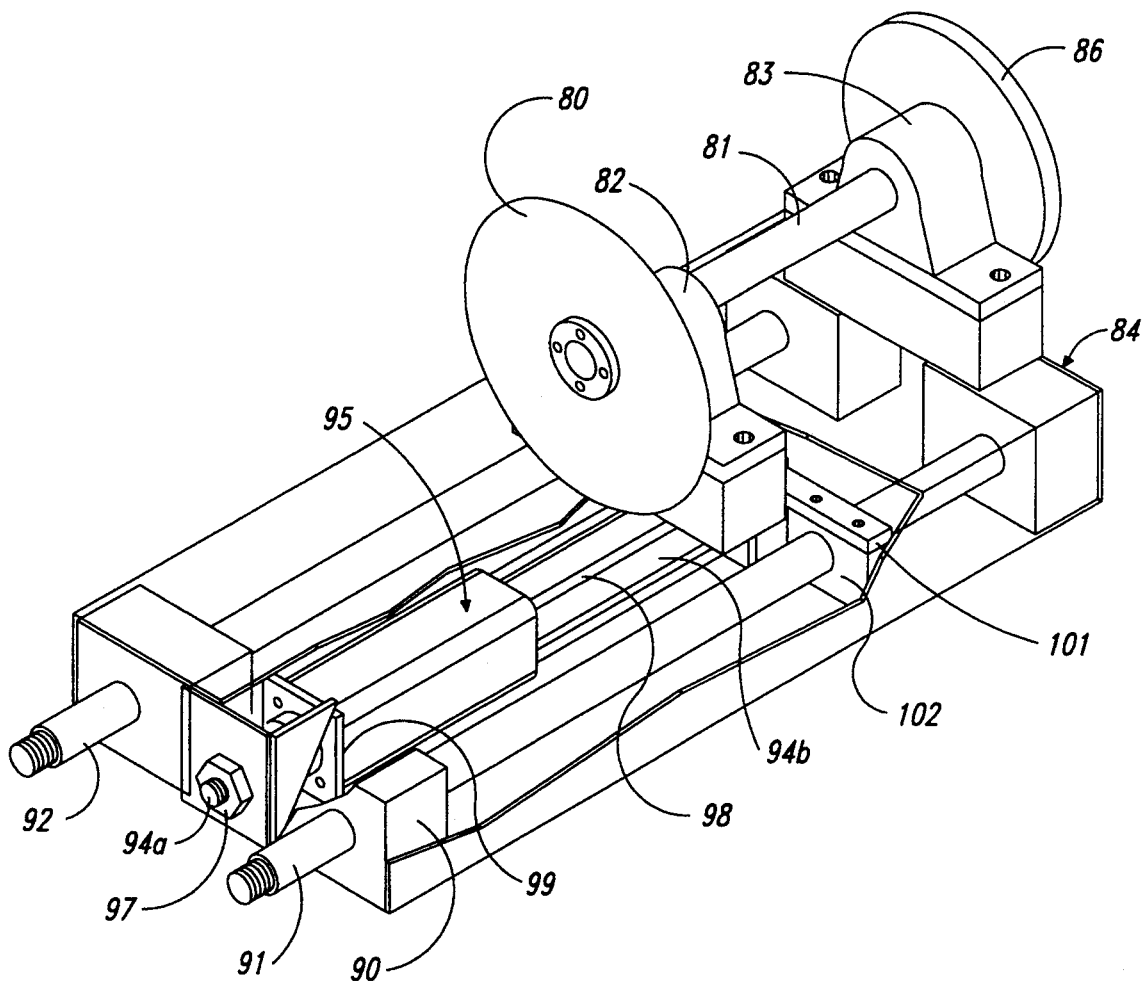
FIG. 11 is a perspective view of the splitting apparatus at the splitting station.
Figure 12:
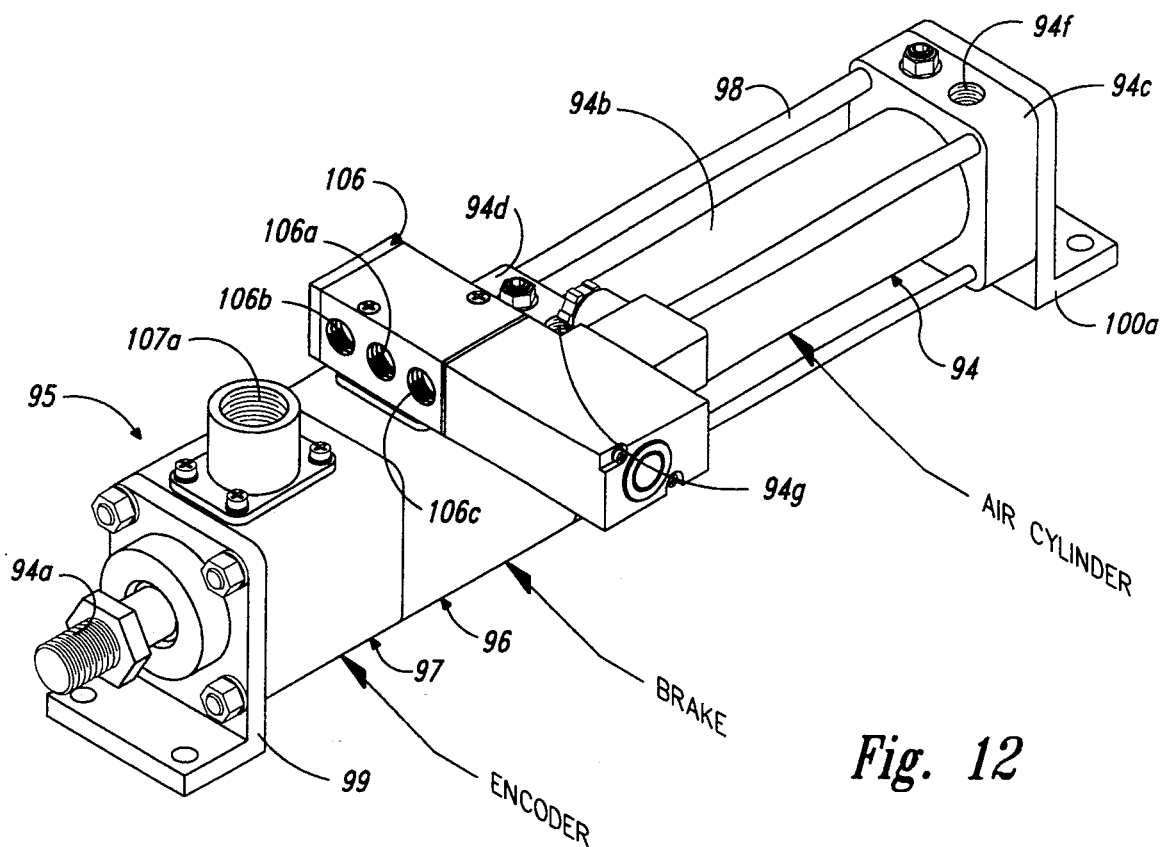
FIG. 12 is a bottom perspective view of the positioning assembly portion of the splitting apparatus.
Figure 13:
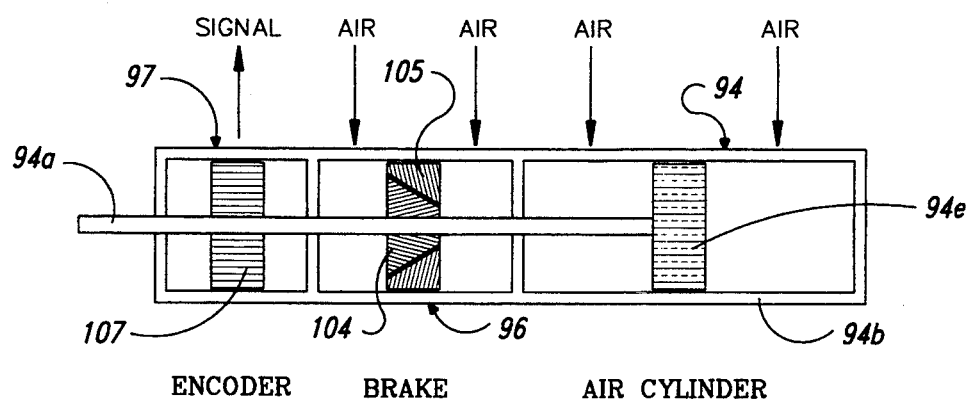
FIG. 13 is a schematic of the positioning assembly of FIG. 12.

Directing attention to FIGS. 11-13, the rotary splitting knife 80 is mounted on the inner end of a transverse shaft 81 supported by a pair of bearings 82-83 which are mounted on a positioner shuttle frame 84. A drive pulley 86 is mounted on the other end of the shaft 81 and has a drive belt 87 (FIG. 1) driven by a stationary motor 88 mounted on the processing machine frame. The shuttle frame 84 is slide-mounted by four corner linear bearing blocks 90 on a pair of stationary parallel guide rods 91-92. These guide rods 91-92 have threaded ends secured by nuts to the processing machine frame and extend beneath the lower run of the conveyor in transverse relation such that the plane of the splitting knife 80 is always parallel to the plane defined by the travel axis of the conveyor.

The shuttle frame 84 is positioned by a double-acting pneumatic positioning cylinder unit 94 in a positioning assembly 95. The piston rod 94a of the cylinder unit 94 extends through a brake and encoder unit 96, 97 and connects to the end of the shuttle frame 84 and thus to the knife 80. The cylinder 94b of the cylinder unit 94 has end manifolds 94c, 94d with extension and retraction ports 94f, 94g for compressed air. The end manifolds are held in place by four tie rods 98 which pass through the housings of the brake and encoder units 96, 97 and through end brackets 99, 100 to receive nuts 98a to hold these components together as a positioning assembly. The end bracket 100 is an angle bracket and has one of its flanges 100a bolted to a cross-head 101 which has clamps 102 gripping the guide rods 91–92. Hence, the cylinder 94b and the housing of the brake and encoder unit 96 are fixed, whereas the piston rod 94a moves endwise responsive to movement of its piston 94e, thereby moving the shuttle frame 84 to which the piston rod is connected at nut 97.

Referring to FIG. 13, the brake component of the unit 97 comprises a cone 104 slidably mounted on the piston rod 94a to seat in a conical seat 105 when the proper adjustment between the piston 94e and cylinder 94b has been accomplished. Compressed air is selectively applied on opposite ends of the cone 104 through a solenoid controlled air valve 106 mounted on the brake. The center port 106a of the valve is connected to a compressed air supply and the other two ports 106b and 106c are vented. When the cone 104 is seated it is compressed around the piston rod 94a to lock the shuttle frame relative to the machine frame via the cross-head 101 and guide rods 91–92. As indicated in FIG. 3 the linear encoder component 107 of unit 96 is connected to the microprocessor by wires extending from a fitting 107a and indicates to the microprocessor the position of the shuttle frame 84 and splitting knife 80 relative to the machine frame. When the desired position is achieved, pressurized air is introduced to seat the cone 104 by pressurizing the chamber at the larger end of the come and venting the chamber at the smaller end to thereby lock the piston rod 94a. Such a cylinder/-brake/encoder unit is available from Emprotech Corp., Livonia, Mich., as United States distributor for Nagoya Sanyo Denki, Nagoya, Japan. The unit is designated CYLNUC Model No. SBB-40x100 LB5BVONOJOAI.

Since the conveyor has several crab holding carriers between the measuring station and the splitting knife, it is necessary to provide a counter for the microprocessor so that each positioning signal is delayed a corresponding number of carriers after the respective reading from the sensors at the measuring station. The splitting knife are coordinated by a timing cam 110 (FIGS. 2–4) operating in conjunction with a fixed proximity sensor 112. As detailed earlier, the sprocket 23 is sized such that two crab carriers 26 move by the measuring station 11 each revolution of the sprocket. The shaft 113 has a pulley 115 driven by a belt 116 from a variable speed motor 117 via a drive pulley 118 idler 119 and belt tensioning pulley 120. The passage of each lobe of the timing 110a, 110b past the timing sensor 112 marks the passage of one crab carrier. The distance between the measurement station 11 and the cutting station 15 is set to be an integer multiple of the distance (module) between adjacent crab carriers 26 as, for example, five modules. This input to the microprocessor indicates that the last centering adjustment measured must be stored for five modules before the correction is transferred to the splitting station 15.

After the splitting has been accomplished the split crab carcass moves to the unloading station 16 at which the respective clamping arms 27 are swung outwardly relative to the bed plates 30 by engagement of the sloped portion 52a of the cam plates 52 when engaged by the follower rollers 34 so that the carcass can drop free of the carrier 26 as it starts around the rear sprocket.

Referring to FIGS. 3–4, schematics of the control system for the machine are illustrated in conjunction with a microprocessor/controller 130. As has previously been discussed, the control system is provided to properly cycle the positioner for the star wheel 70, and to operate the positioner for the splitting knife 80 so that the knife will evenly divide each crab carcass. The output of the rotary encoders 62 operated by the measuring arms 54 provides the microprocessor with (1) the data needed to determine the offset (if any) of the center of the measured crab from the vertical center plane of the conveyor, and (2) the data needed to compute the front to back length of the body of the measured crab. The output of the timing sensor 112 associated with the timing cam 110 provides the microprocessor with the data required (1) to commence the star wheel operating cycle, and (2) to operate the knife positioner when the measured crab reaches the knife positioner 95 at the splitting station. This latter function involves a predetermined delay of an output signal from the microprocessor to the knife positioner corresponding to the travel time for a crab carrier to be conveyed from the measuring station to a predetermined position adjacent the splitting knife.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A crab processing machine comprising:
   a frame;
   an endless conveyor on said frame having a laterally-centered endless travel path defining an upright center plane, said travel path having a rearwardly moving upper run and a downwardly moving lower run connected by front and back arcuate travel sections;
   means for advancing said conveyor at a selected speed;
   crab holders mounted on said conveyor at regular intervals along said travel path and each adapted to hold a crab with its body in rearwardly facing position such that each held crab has its carapace exposed and free to be removed and has the width of its carapace between its legs positioned transverse to said path and generally centered relative to said path;
   measuring means at a measuring station for measuring the width of the carapace and the offset distance of the lateral center of the carapace of a held crab from said center plane while being conveyed past said measuring station, and for converting the carapace width measurement into a corresponding length dimension;

removal means on said frame at a removal station downstream of said measuring station for removing the mandible, carapace and tail of a held crab in a controlled cycle while being conveyed along said travel path past the removal station to thereby expose the body cavity;

cleaning means on said frame at a cleaning station for cleaning out the body cavity and removing the gills of a held crab while the crab is being conveyed along said travel path after passing the removal station, thereby providing a crab carcass;

and a rotary splitting knife carried by said frame at a splitting station to rotate about a rotary axis which is transverse to said center plane, said knife being arranged to be engaged by a crab carcass such that the carcass is cut along a cutting line into two pieces each containing half of the legs of the split carcass;

first adjustment means for varying the duration of said cycle of the removal means;

second adjustment means for selectively moving said splitting knife along said rotary axis in advance of the approach of a conveyed crab carcass to a position in which such carcass will be split evenly in half;

and control means operatively associated with said measuring means and first and second adjustment means for operating said first adjustment means in a removal cycle determined by the body length of a measured crab when it passes said removal station, and for operating said second adjustment means to move the knife to a position such that its cutting line will be spaced from said travel axis the said offset distance when the carcass of the measured crab engages said knife.

2. A crab processing machine according to claim 1 in which said crab holders include leg clamping arms having an open loading and unloading position and a closed clamping position, and means associated with said conveyor for opening and closing said arms as the crab carriers move between said splitting station and said measuring station whereby split crab carcasses can be removed from said crab holders and crabs to be processed can be loaded on :said crab holders.

3. A crab butchering machine comprising:

a series of evenly spaced crab gripping devices each adapted to grip the legs of a crab leaving the carapace exposed for removal;

an endless conveyor system for moving respective crabs gripped by said gripping devices in a rearwardly facing upright position along a predetermined crab travel path at a selected forward speed;

a rotary star wheel having a plurality of radially projecting arms;

rotating means for rotating said Star wheel so that said arms move in the opposite direction from the conveyor motion when the arms move adjacent to the conveyor; and reciprocating means for reciprocating said rotating star wheel upward and away from said conveyor system in a cycle between a retracted position spaced away from said crab travel path and an active position whereat said arms intersect said crab travel path each instance a gripped crab passes said wheel, whereby said arms engage and remove the mandible, carapace, and tail of each gripped and conveyed crab.

4. A crab butchering machine according to claim 3 in which a control means is provided for varying the time that said star wheel is in its active position adjust for various crab body sizes.

5. A crab butchering machine according to claim 3 in which measuring means is located in advance of said wheel for determining the time period for passage of the carapace of a gripped crab by a point in said travel path, such time period being an indicator of the length of the crab's body along said travel path, and in which control means is provided for responsively varying the proximity of said active position to said travel path in accordance with the body length of the gripped crab which is passing the wheel.

6. A crab butchering machine according to claim 3 in which said travel path has an arcuate travel section between an upper run of the travel path and a lower run thereof where said crab gripping devices pass said wheel.

7. A crab butchering machine according to claim 6 in which said rotating wheel moves from said active position to said retracted inactive position while each of said crab gripping devices moves from said upper run into the upper half of said arcuate travel section, and said rotating wheel returns to said active position while each crab gripping device moves through the lower half of said arcuate section.

8. In a crab processing machine comprising:

a frame;

an endless conveyor on said frame having a laterally-centered endless travel axis defining a center plane;

crab holders mounted on said conveyor at regular intervals along said travel axis and adapted to hold crabs such that each held crab has its carapace exposed and free to be removed and has the width of it carapace between its legs transverse to said center plane and generally centered relative to said center plane;

removal means on said frame for removing the mandible, carapace and tail of a held crab while being conveyed along said travel axis to thereby expose the body cavity;

cleaning means on said frame for cleaning out the body cavity of a held crab while the crab is being conveyed along said travel axis, thereby providing a crab carcass;

and a cutting device carried by said frame to operate in a plane which is parallel to said center plane, said cutting device being arranged to be engaged by a crab carcass such that, the carcass is cut along a cutting line into two pieces each containing half of the legs of the split carcass;

the improvement comprising:

adjustment apparatus for selectively moving said cutting device in advance of the approach of a conveyed crab carcass to a position in which such carcass will be split evenly in half;

measuring apparatus in advance of said removal means for measuring the offset distance of the lateral center of the carapace of a held crab from said center plane while being conveyed;

and control means operatively associated with said measuring means and adjustment means for operating said adjustment means to move the cutting device to a position such that its cutting line will be spaced from said center plane the said offset distance when the carcass of the measured crab engages said cutting device.

9. In a crab processing machine according to claim 8, said cutting device comprising a rotating cutting wheel.

10. In a crab processing machine according to claim 8, in which said measuring apparatus includes a pair of measuring arms mounted on opposite sides of said center plane in positions to be engaged by the carapaces of conveyed crabs, said arms being arranged to move outwardly away from said center plane in response to each such carapace engagement, the difference in the outward movement of said arms as a held crab passes said arms determining the offset distance of the lateral center of the carapace of the crab.

11. In a crab processing machine according to claim 8 in which said cutting device is mounted on a carrier which is slide mounted relative to said frame to move perpendicular to said center plane, and said control means includes a device for sliding said carrier in accordance with each said measured offset distance.

12. In a crab processing machine:
a frame;
an endless conveyor on said frame having a laterally-centered endless travel axis defining a center plane;
crab holders mounted on said conveyor at regular intervals along said travel axis and adapted to hold crabs such that each held crab has its carapace exposed and free to be removed and has the width of it carapace between its legs transverse to said center plane and generally centered relative to said center plane;
removal means on said frame at a removal station for removing the mandible, carapace and tail of a held crab while being conveyed along said travel axis to thereby expose the body cavity, said removal means operating in said center plane in a removal cycle determined by the body length of the crab passing the removal station;
and measuring means in advance of said removal station for determining the period of time for the passage of each conveyed crab, and for converting each such period into a corresponding body length for control of said removal cycle.

13. In a crab processing machine according to claim 12, said removal means including a rotating star wheel which is swing-mounted on said frame to swing in said center plane toward and away from an active position adjacent said travel axis, and including apparatus for varying the location of said active position in accordance with each said crab body length.

14. In a crab processing machine:
an endless conveyor with crab carriers mounted thereon for moving the crab carriers by a crab loading station, crab processing stations, and a crab unloading station in an advancing forward direction,
each said carrier having mounting plate means for supporting a crab body, and having a pair of spring-loaded leg clamping arms which are pivotally mounted at the back of the carrier and extend forwardly, said clamping arms having an open raised position whereat a crab can be loaded at the loading station from the front of the carrier into the carrier in an upright rearwardly facing position with its body resting on said mounting plate means and its two sets of legs beneath respective of said pair of arms;
and cam means for raising said arms to said open position at said unloading station in opposition to said spring loading and for keeping said arms in said open position until the respective carrier leaves the loading station.

15. In a crab processing machine according to claim 14, said arms having bottom clamping jaws faced with a rubber-like material for gripping the crab legs.

16. In a crab processing machine according to claim 14, said mounting plate means presents a central front clearance recess for clearance of processing apparatus for removal of the mandible, carapace and tail of a gripped crab at one of the processing stations.

17. In a crab processing machine according to claim 14 in which said mounting plate means has a central rear entry recess which is generally V-shaped to assist in initial centering of a crab while being loaded on a said carrier.

18. In a crab processing machine according to claim 14 in which said mounting plate means has stop elements to fix the position of the front of the crab body during loading.

* * * * *